(12) United States Patent
Cappaert et al.

(10) Patent No.: US 10,637,561 B2
(45) Date of Patent: Apr. 28, 2020

(54) ADAPTABLE SPACE RADIO

(71) Applicant: Spire Global, Inc., San Francisco, CA (US)

(72) Inventors: Jeroen Cappaert, Sint-Gillis-Waas (BE); Bryan Wong, Carmel, CA (US); Robert Deaton, San Francisco, CA (US); Jonathan Rosenblatt, San Mateo, CA (US); William Joel Spark, Calgary (CA)

(73) Assignee: SPIRE GLOBAL, INC., San Francisco, CA (US)

( * ) Notice: Subject to any disclaimer, the term of this patent is extended or adjusted under 35 U.S.C. 154(b) by 0 days.

(21) Appl. No.: 15/814,734

(22) Filed: Nov. 16, 2017

(65) Prior Publication Data

US 2019/0149227 A1    May 16, 2019

(51) Int. Cl.
*H04B 7/185* (2006.01)
*H04B 7/155* (2006.01)
*H04W 76/10* (2018.01)

(52) U.S. Cl.
CPC ......... *H04B 7/18528* (2013.01); *H04B 7/155* (2013.01); *H04B 7/18502* (2013.01); *H04B 7/18513* (2013.01); *H04W 76/10* (2018.02)

(58) Field of Classification Search
CPC ......... H04B 7/185–2046; H04B 7/155; H04W 76/10
See application file for complete search history.

(56) References Cited

U.S. PATENT DOCUMENTS

| | | | |
|---|---|---|---|
| 5,276,908 A | | 1/1994 | Koohgoli et al. |
| 5,566,354 A | * | 10/1996 | Sehloemer ......... H04B 7/18539 455/13.1 |
| 5,701,598 A | | 12/1997 | Atkinson |
| 6,112,094 A | * | 8/2000 | Dent ...................... H04B 1/713 375/132 |
| 6,226,521 B1 | * | 5/2001 | Liu ...................... H04B 7/2123 455/12.1 |
| 6,628,919 B1 | | 9/2003 | Curello et al. |
| 6,847,817 B2 | | 1/2005 | Hadinger et al. |
| 6,850,743 B2 | | 2/2005 | Davis et al. |
| 7,609,747 B2 | | 10/2009 | Mahany |

(Continued)

*Primary Examiner* — Raymond S Dean
(74) *Attorney, Agent, or Firm* — Troutman Sanders LLP

(57) ABSTRACT

Systems and methods are disclosed herein for adaptively coordinating among satellite communication channels. A method, according to an example implementation of the disclosed technology, can include: receiving, at a radio frequency receiver disposed on a target satellite, a plurality of signals associated with a corresponding plurality of candidate satellite communication channels; detecting, among the plurality of signals, a command structure; selecting, for communications with a first ground station, a first channel of the candidate satellite communication channels, based at least in part, on information in the detected command structure; establishing a communication link with the first ground station using the first channel; receiving, via the first channel, and from the first ground station, one or more downlink instructions; selecting a downlink communication channel based on the received one or more downlink instructions; and transmitting information to the first ground station via the selected downlink communication channel.

20 Claims, 5 Drawing Sheets

(56) References Cited

U.S. PATENT DOCUMENTS

| | | | |
|---|---|---|---|
| 7,650,165 B2 | 1/2010 | Chuprun et al. | |
| 9,637,889 B2 | 5/2017 | Elkins | |
| 2001/0013566 A1* | 8/2001 | Yung | H04B 7/195 244/158.4 |
| 2014/0218242 A1* | 8/2014 | Platzer | G01S 5/0027 342/454 |
| 2016/0254858 A1 | 9/2016 | Cappaert et al. | |
| 2018/0139074 A1* | 5/2018 | Hong | H04B 7/185 |

* cited by examiner

ADAPTABLE SPACE RADIO

FIELD

This disclosed technology relates to an adaptable space radio for use in satellite systems, and in particular, to systems and methods for coordinating communications and adapting frequencies associated with the satellite communication signals and associated channels.

BACKGROUND

The radio spectrum utilized in satellite communication is a scarce and congested resource. In geosynchronous orbit, satellites are at the same altitude, and each satellite is assigned its own orbital slot and is granted frequency rights that go along with that slot. Only a certain number of slots exist and no two satellites can be in the same slot.

In low earth orbit, many satellite systems are not in stable orbits, and therefore, orbits at many altitudes are used. Satellites in low earth orbit may be above or below each other and may be within other satellites' transmitting beams. Further, wide beam antennas are used by some operators to establish strong links to unstable satellites that lack propulsion for station keeping. New entrants must coordinate with existing users (usually numbering in the hundreds) to establish their space to earth and earth to space communication links. This applies to many bands that are of use to small satellites, including, without limitation, UHF, S band and X band. Such coordination can take valuable time and can limit access to space. A need exists for improved systems and methods to address such issues and challenges.

BRIEF SUMMARY

Some or all of the above needs and other problems not listed above may be addressed by certain implementations of the disclosed technology. Certain implementations of the disclosed technology may include systems and methods for adaptively coordinating among satellite communication channels.

The disclosed technology includes a method for adaptively coordinating among satellite communication channels. The method can include: receiving, at a radio frequency receiver disposed on a target satellite, a plurality of frequencies associated with a corresponding plurality of candidate satellite communication channels; detecting, among the plurality of frequencies, a command structure; selecting, for communications with a first ground station, a first channel of the candidate satellite communication channels, based at least in part, on information in the detected command structure; establishing a communication link with the first ground station using the first channel; receiving, via the first channel, and from the first ground station, one or more downlink instructions; selecting a downlink communication channel based on the received one or more downlink instructions; and transmitting information to the first ground station via the selected downlink communication channel.

The disclosed technology includes a satellite communications system that includes: a plurality of satellites including a target satellite; a plurality ground stations including a first ground station; at least one memory for storing data and computer-executable instructions; at least one processor in communication with the at least one memory. The at least one processor is further configured to execute the computer-executable instructions to cause the system to: receive, at the target satellite, a plurality of frequencies associated with a corresponding plurality of candidate satellite communication channels; detect a command structure among the plurality of frequencies; select, for communications with the first ground station, a first channel of the candidate satellite communication channels, based at least in part, on information in the detected command structure; establish a communication link with the first ground station using the first channel; receive, via the first channel, and from the first ground station, one or more downlink instructions; select a downlink communication channel based on the received one or more downlink instructions; and transmit information to the first ground station via the selected downlink communication channel.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
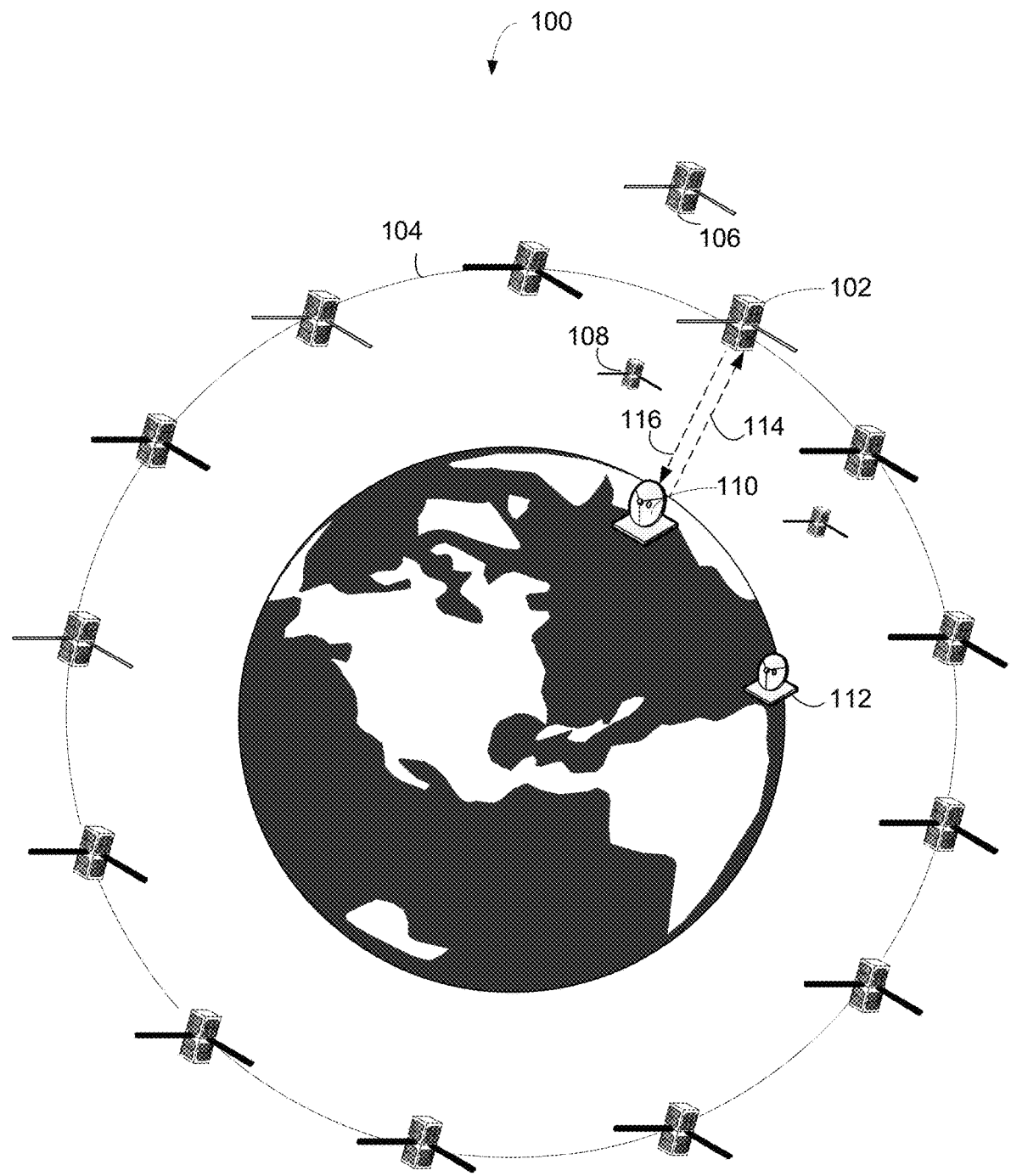
FIG. 1 depicts an example satellite communications system 100, according to an example implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

The disclosed technology addresses certain challenges associated with coordinating communications among satellites and ground stations, particularly given the limited number of communication frequencies available for such communications. The disclosed technology includes a software defined adaptable space radio (ASR) that can change communication frequencies based on factors such as: orbit, orientation, coordination with other satellites, coordination of ground station transmissions, noise levels, knowledge, etc. In one example implementation, the ASR may utilize a radio frequency receiver with digital filters. For example, the radio frequency receiver may be configured to "listen" to a wide range of possible signals with corresponding frequencies that may be used by an accompanying ground station network.

In accordance with an example implementation of the disclosed technology, digital filters, configurable on orbit, may be utilized to further selectively narrow the frequency range "listened" to, for example, as coordination progresses and available frequencies and related limits become known. In this respect, the speed to space may be increased, and satellite utilization may be improved by launching satellites on a non-interference, non-protected basis while coordination is conducted. Then subsequently, and according to an example implementation of the disclosed technology, communication frequencies may be adjusted as necessary to coordinate around possibly conflicting communication channels, operator instructions, etc. Certain example implementations of the disclosed technology may be utilized to coordinate with ground stations using knowledge of which frequency it can use for a given pass of the satellite. Once an initial link is established, the satellite may receive a command from the ground station specifying which frequency (or set of frequencies) to use for downlink.

The ability of the ASR to change communication frequencies adaptively may provide certain technical benefits and flexibilities for coordinating satellite communications. For example, as new satellites are deployed and brought on-line, certain implementations of the disclosed technology enable switching among and utilizing the available frequency channels, rather than being rigidly limited to a dedicated communication frequency. The adaptable utilization of available frequencies may help simplify satellite deployment, particularly in scenarios involving a group of satellites having a deployment schedule that spans months or years.

Certain implementations of the disclosed technology may include scalable systems and methods for efficiently tasking satellite constellations. U.S. patent application Ser. No. 15/221,908, filed 28 Jul. 2016, (the contents of which are incorporated by reference as if presented in full) discusses certain implementations that may provide appropriate communications and commands, issued within appropriate time windows, for coordinating individual satellite behavior in concert with the other satellites in the constellation. Certain example implementations may further enable efficient command and control of a group of satellites having a variety of different capabilities, hardware, operating systems, and/or software/firmware versions.

U.S. Patent Publication US 2016/0254858 (the contents of which are incorporated by reference as if presented in full) discusses a radio communications system for a small form factor satellite. Certain example implementations of the disclosed technology may be further utilized at a radio frequency transmitter disposed on a first ground station of a series of ground stations to enable transmitting communications using a predetermined set of channels for such ground station. For example, the set of channels may be selected based on factors such as regulatory licenses, coordination agreements, time of day restrictions, orbital screening restrictions and other coordination related restrictions on operations related to such first ground station.

Certain example implementations of the disclosed technology may be utilized at a radio frequency receiver disposed on a target satellite to enable scanning, for example through selective filtering, over a range of possible frequencies associated with potential communication channels used by any ground station in a network of ground stations. In certain example implementations, the selection of a first reception channel of the plurality of predefined satellite reception channels may be based on information transmitted via a channel used for the incoming transmission from the first ground station. For example, an incoming transmission from the first ground station may contain an instruction on what channel(s) the satellite should utilize to respond to such incoming transmission from such first ground station. Such instructions may be based on factors such as regulatory licenses, coordination agreements, time of day restrictions, orbital screening restrictions and other coordination related restrictions on operations related to such first ground station. In some implementations, the instructions may be received while the first satellite is in view of the first ground station, but may include channel selection instructions for anticipated coordination of communications with other ground stations, for example, after the first satellite is no longer in view of the first ground station.

U.S. Pat. No. 9,637,889 (the contents of which are incorporated by reference as if presented in full) discusses systems and methods for satellite-ground communications to support data collection and management. Certain example implementations of the disclosed technology may further enable a satellite to select a downlink communication channel from among a plurality of possible channels, based on the received instruction. Certain example implementations include transmitting information to the first ground station via the selected downlink communication channel.

Certain example implementations of the disclosed technology may repeat the process described above for subsequent ground stations. For example, a second ground station may utilize a second predetermined set of channels for such second ground station based on such factors as regulatory licenses, coordination agreements, time of day restrictions, orbital screening restrictions and other coordination related restrictions on operations related to such second ground station. This process may be repeated as the satellite moves to each ground station among the ground station network.

FIG. 1 depicts a satellite communications system 100, according to an example implementation of the disclosed technology, in which a target satellite 102 is in a low earth orbit 104 with a plurality of other satellites in the same orbit, while a second satellites 106 (and/or additional satellites 108) may be in orbits having different altitudes. As depicted in FIG. 1, and according to an example implementation of the disclosed technology, the target satellite 102 may establish communication with a ground station 110, 112, for example, by listening for transmissions from the ground stations 110, 112 and/or scanning through certain frequencies until a predetermined indication (such as sync word or sequence) is detected. Upon detection of the indication, the target satellite 102 may receive and interpret uplink 114 commands for establishing parameters for downlink 116 communications with a given ground station 110. For example, a ground station 110 may transmit up at 402.5 MHz via the uplink 114 with instructions for the target satellite 102 to communicate back on 402.8 MHz via the downlink 116. In an example implementation, the target satellite 102 may be scanning across 400-403 MHz, may detect the ground station 110 transmitting on 402.5 MHz, may receive instructions to transmit down at 402.8 MHz, and in response, may make the appropriate adjustments to transmit down at 402.8 MHz.

Certain implementations may coordinate with ground stations 110, 112. For example, a ground station 110 can be configured with knowledge of which frequency it can use for a given pass of the satellite 102. Once an initial link is established, the satellite 102 may receive a command 114 from the ground station 110 specifying which frequency (or set of frequencies) to use for downlink 116 communications. This process may be repeated as the satellite 102 moves to the next ground station 112 communications window.

According to another example implementation of the disclosed technology, multi-mission satellites 102 may be implemented using a "receive-only" payload, in which a particular range of frequencies is monitored for a particular application (such as 150-160 MHz for AIS, i.e., ship tracking), but for which a different range of frequencies may be monitored for a different application (such as 1087.7-1092.3 MHZ for automatic dependent surveillance-broadcast (ADS-B), i.e., plane tracking). Accordingly, the capability of each satellite can be selectively changed for a given mission objective.

Certain example implementations of the disclosed technology utilize an adaptable space radio that can change frequencies while in orbit based on certain coordination factors. As links are coordinated over time, the space radio parameters may be changed to match the outcome of coordination. For instance, if a communication issue or conflict is encountered with a target satellite 102 transmitting on a given frequency when a second satellite 108 is in view of the same ground station 110, the associated orbits of the target satellite 102 and the second satellite 108 can be determined, and the target satellite 102 may be instructed to use a different frequency during the current and/or subsequent conflict paths.

Implementation

In accordance with certain example implementations of the disclosed technology, a satellite may be configured with a software defined space radio (SDSR). The SDSR may be configured with radio hardware capable of listening over a broad range of frequencies. In accordance with certain aspects of the disclosed technology, one or more digital filters may be utilized to narrow the listening frequency range as needed, for example, so that any one of a plurality of predefined communication channels may be selected for reception. In certain example implementations, the communication channels may be adaptively re-configured post launch, for example, to enable flexibility in the satellite communications capabilities, and to allow tuning to other sets of frequencies/channels that may not have necessarily been predefined before launch.

Certain example implementations of the disclosed technology may utilize one or more of encryption, a synch word, a predetermined sequence, etc. (collectively referred to hereinafter as a synch word) to initiate communication between a ground station 110 and a target satellite 102. In accordance with an example implementation of the disclosed technology, the reception (and confirmation) of the synch word may be utilized to ensure that transmissions from the ground station 110 are received by the target satellite 102, even if another satellite 106, 108 is utilizing the same frequency/channel, and/or if the target satellite 102 can "hear" communications from a second ground station 112 that is intended for reception by the other satellite 106, 108. In other words, the synch word may be utilized to insure that a given target satellite 102 only responds to instructions that are intended for it.

As disclosed in U.S. patent application Ser. No. 15/221, 908 and incorporated herein by reference, knowledge data may be utilized to coordinate communications between/ among the various satellites and ground stations. For example, the knowledge data may include status/capability information corresponding to a plurality of components associated with a satellite communications system, satellite constellation, ground stations, mission objectives etc. In certain example implementations, knowledge data may be utilized for one or more of: determining a status of at least one satellite, scheduling a satellite control system based at least in part on a received mission objective; commanding a satellite to take a specified action based at least in part on the mission objective; initiating communication with a satellite according to the scheduling; receiving updated status information for associated components; updating status information, etc. For example, the knowledge data may be utilized to monitor the satellite system, update command and control software, and coordinate changes as the various missions progress.

According to an example implementation of the disclosed technology, a given satellite may pass above a given ground station, and the satellite may scan across all its potential frequencies to listen for intended communications from the ground station. In certain example implementations, the range of scanning frequencies may be configured with an initial range (for example, 399.9-403 MHz) and the range may be selectively configured, based on instructions received from the ground station for the satellite to scan through another and/or additional frequency range (for example, 449.75-450.25 MHz). In certain example implementations, the satellite may scan over the first range of frequencies (e.g., 399.9-403 MHz), skip over the gap, scan through a second range of frequencies (e.g., 449.75-450.25 MHz), and repeat as needed. For example, scanning may continue until the proper synch word is detected and communication is established with the ground station.

As briefly described above, and in accordance with certain example implementations, the ground station may have knowledge of which frequency it can use for a given pass, and it may send the synch word to the satellite on that frequency, along with a command for what frequency the satellite is to utilize for downlink. In an example implementation, the remainder of the pass (subject to any constraints in coordination such as minimum elevation) may be done in that established frequency set. Subsequently, and according to an example implementation of the disclosed technology, the satellite then moves on to the next ground station and a similar process may be utilized. In certain ground stations and passes, commands may be omitted if that particular pairing between ground station and satellite is not achievable in any useable frequency.

Figure 2:
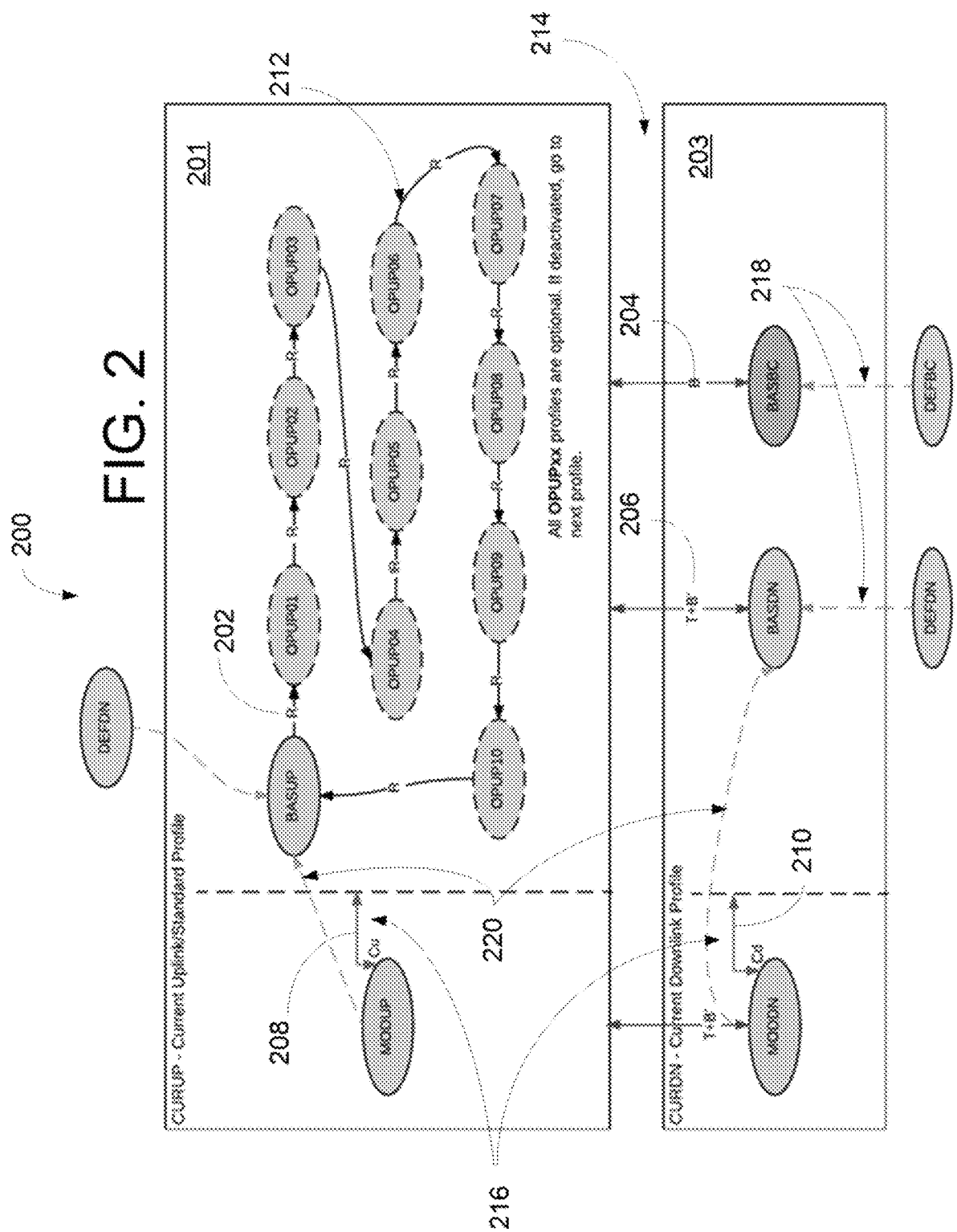
FIG. 2 is a diagram of an example profile transition scheme 200, according to an example implementation of the disclosed technology.

FIG. 2 is a diagram of an example profile transition scheme 200, according to an example implementation of the disclosed technology. Certain details with regard to the profiles and associated transitions are discussed further in the IMPLEMENTATION SUMMARY. According to certain example implementations, the profiles may be generally divided into a current uplink profile scheme 201 (CURUP), and a current downlink profile scheme 203 (CURDN), with associated profiles. In an example implementation, certain starting default profiles may be utilized, including but not limited to (a) Starting Default Uplink/Standard Profile (DEFUP), (b) Starting Default Downlink Profile (DEFDN), and (c) Factory Default Beacon Downlink Profile (DEFBC). In certain example implementations, the starting default profiles may be compiled-in profiles and may not be modified at run time. In some implementations, the starting default profiles may not be directly executable, but may be used to configure base profiles (explained below). In some implementations, in case of anomaly or onboard failures, the starting default profiles may be used as failovers for whatever contacts are possible in those profiles.

In accordance with an example implementation of the disclosed technology, certain base profiles may be utilized, including but not limited to: (i) Base Uplink/Standard Profile (BASUP); (ii) Base Downlink Profile (BASDN); and (iii) Base Beacon Downlink Profile (BASBC). According to an example implementation of the disclosed technology, the current base profiles may be stored in memory, and recalled upon boot-up. During a startup, these may be equivalent to the Standard Default Profiles, as described above. In certain example implementations, the base profiles may be configured (set_frequency, set_baudrate_deviation, etc.) and stored (e.g. flash_store). In certain example implementations, an operator may be able to configure each profile individually.

Certain example implementation may include Optional Alternative Uplink Profiles (OAUPs, for example: OPUP01-OPUPxx). For example, and in addition to BASUP, as discussed above, these OAUPs may be utilized selectively to configure the radio parameters for rotating through the various profile-defined communication frequencies, etc. In certain example implementations, the OAUPs may be stored into memory, but may be deleted upon factory default. Further details regarding the various profiles and use are discussed in the IMPLEMENTATION SUMMARY.

Figure 3:
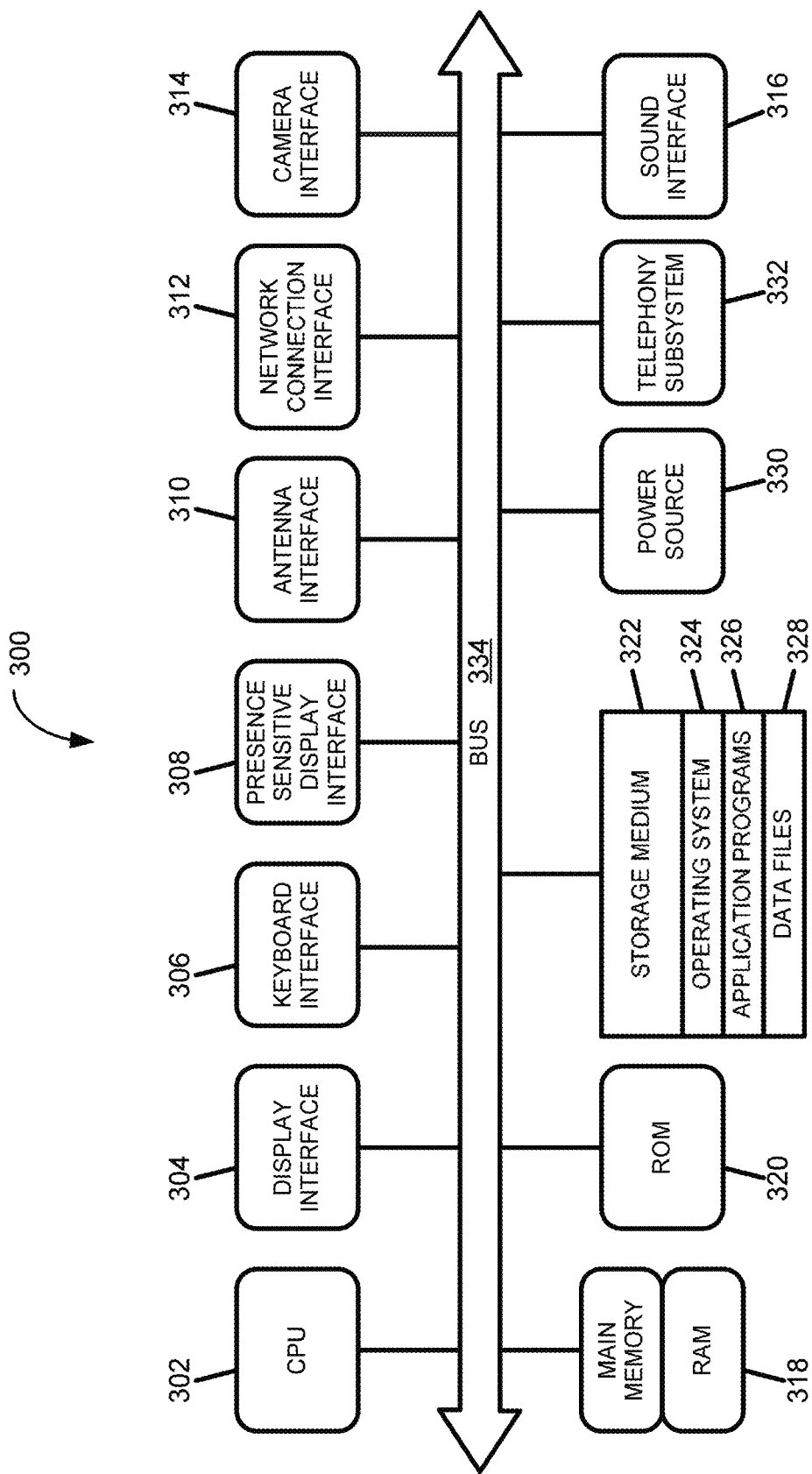
FIG. 3 depicts a block diagram of an illustrative computing device 300 according to an example implementation of the disclosed technology.

FIG. 3 depicts a block diagram of an illustrative computing device 300 according to an example implementation. Certain aspects of FIG. 3 may be embodied in a satellites and/or ground stations (for example, the satellites 102 and/or the ground stations 110, 112 as shown in FIG. 1). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In certain implementation, the computing device 300 may be included in terrestrial base stations (such as the ground stations 110, 112) In another example implementation, the term computing device, as used herein, may refer to a processor and associated components, for example that may be installed in or on a satellite.

In an example implementation, the computing device (particularly if representing the ground station) may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, memory, and memory. Certain example implementations can include a network connection interface 312 that provides a communication interface to a network. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored. In accordance with certain example implementations of the disclosed technology, the application programs 326 can include one or more of programs to dynamically adjust the various parameters, such as one or more of: data packet size; data chunk size; data coding rate; number of re-transmits on uplink; number of tolerated timeouts; maximum transmission time; data compression parameters; bit rate factors; recovery factors; resource burden factors; batching; latency control; advance filtering; etc., as previously described.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like.

In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

Figure 4:
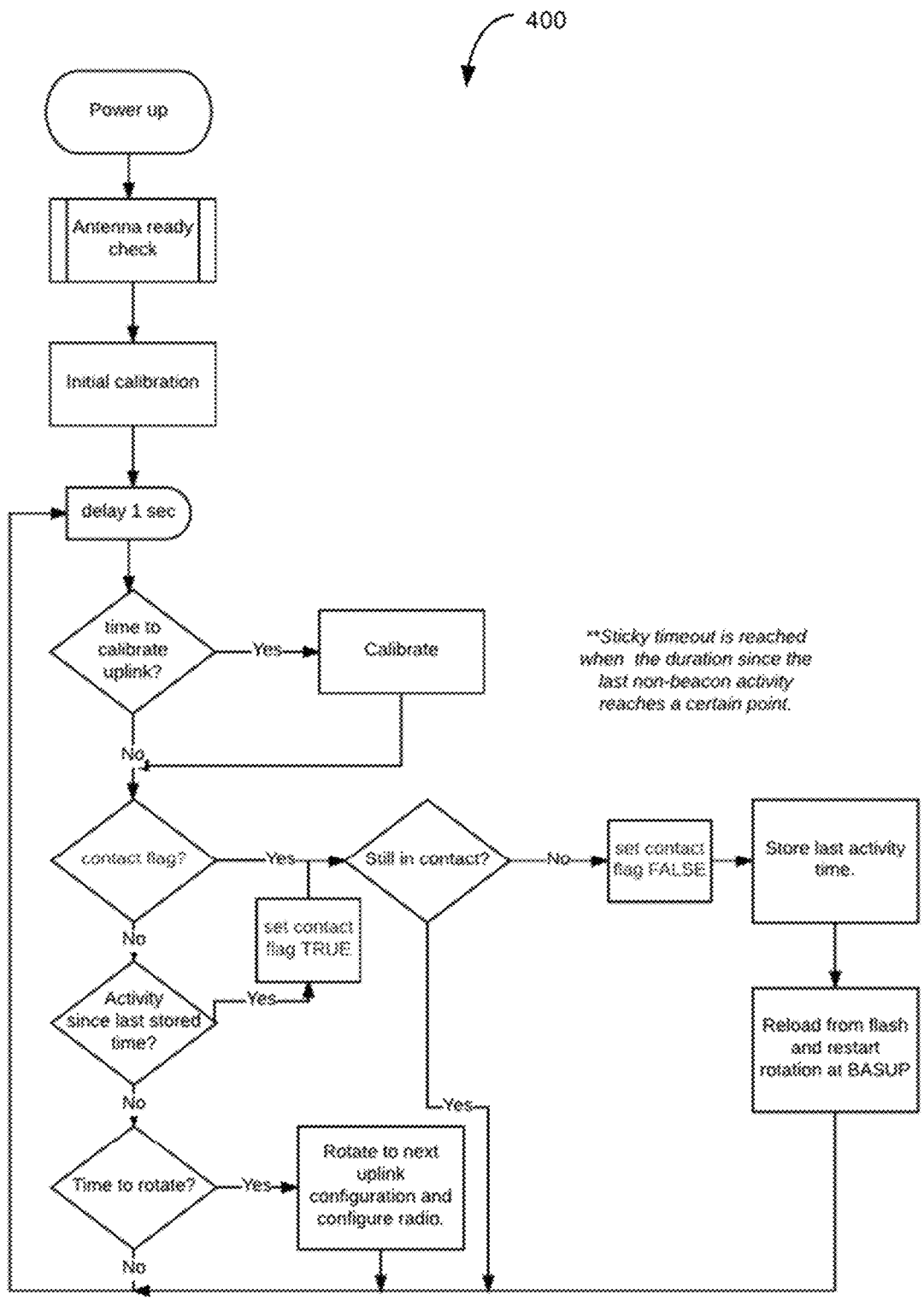
FIG. 4 depicts an example UHF sequencer flowchart 400, according to an example implementation of the disclosed technology.

FIG. 4 depicts an example UHF sequencer flowchart 400, according to an example implementation of the disclosed technology, and as discussed further in the IMPLEMENTATION SUMMARY.

Figure 5:
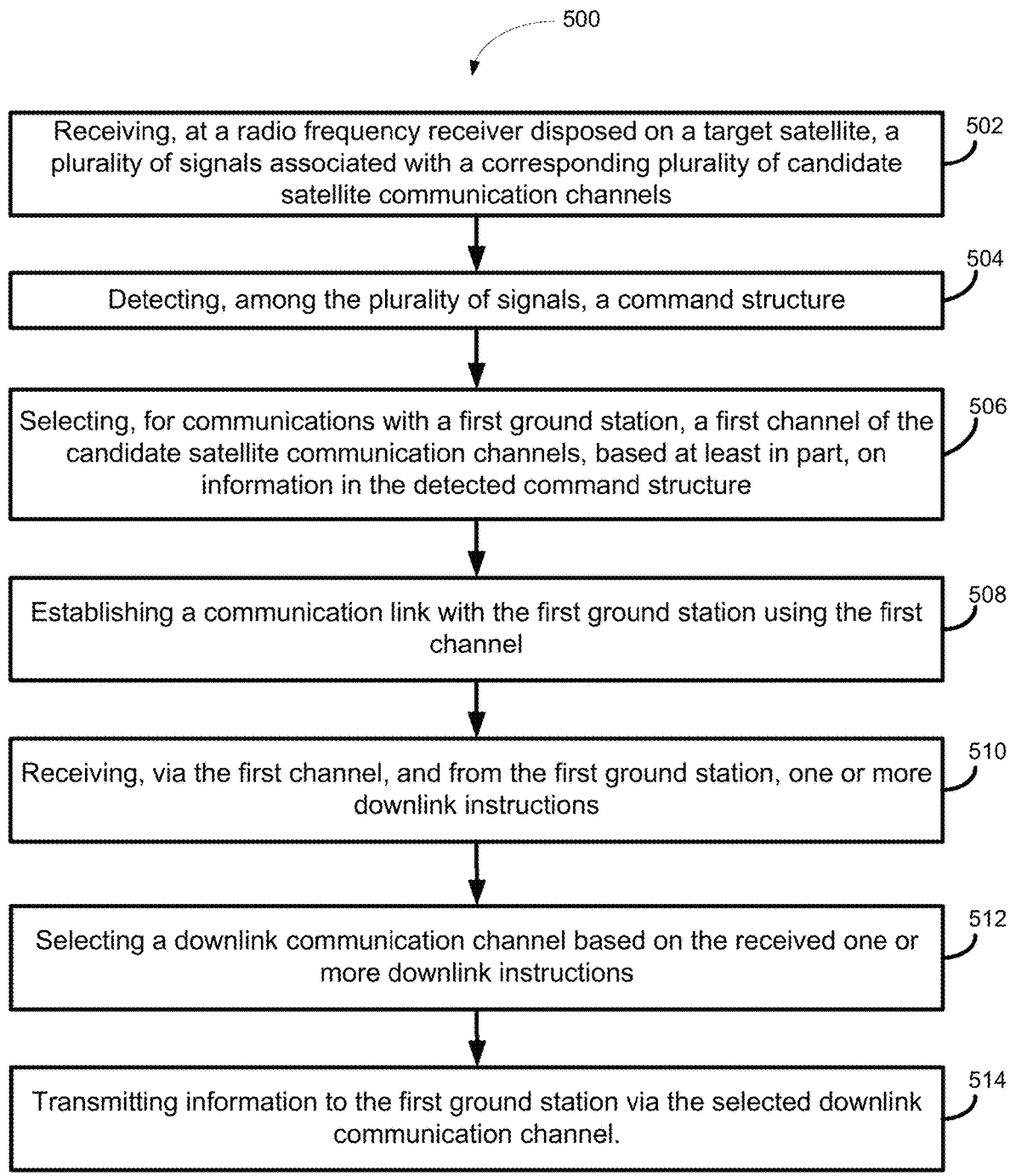
FIG. 5 is a flow diagram of a method 500 according to an example implementation of the disclosed technology.

FIG. 5 is flow diagram of a method 500 for adaptively coordinating among satellite communication channels, according to an example implementation of the disclosed technology. In block 502, the method 500 includes receiving, at a radio frequency receiver disposed on a target satellite, a plurality of signals associated with a corresponding plurality of candidate satellite communication channels. In block 504, the method 500 includes detecting, among the plurality of signals, a command structure. In block 506, the method 500 includes selecting, for communications with a first ground station, a first channel of the candidate satellite communication channels, based at least in part, on information in the detected command structure. In block 508, the method 500 includes establishing a communication link with the first ground station using the first channel In block 510, the method 500 includes receiving, via the first channel, and from the first ground station, one or more downlink instructions. In block 512, the method 500 includes selecting a downlink communication channel based on the received one or more downlink instructions. In block 514, the method 500 includes transmitting information to the first ground station via the selected downlink communication channel.

Some example implementations may include selectively filtering the received plurality of signals to define a reduced subset of candidate channels from the plurality of candidate satellite communication channels.

In certain example implementations, the selection of the first channel of the candidate satellite communication channels may include cycling through a reduced subset of candidate channels.

According to an example implementation of the disclosed technology, the selection of the first channel may be further based on one or more of: header information, a sync word, forward error correction scheme, and/or an encryption key.

In certain example implementations, selecting the first channel may be further based on a status of the target satellite. In certain example implementations, the status of the target satellite can include one or more of: an orbit of the target satellite; an orientation of the target satellite; a geo-location of the satellite; and/or a determined position of the target satellite with respect to the ground station;

In some implementations, selecting the first channel may be based on one or more of: a status of another orbiting satellite; beacon activity of another orbiting satellite; time of day; and/or a likelihood of communication interference.

Certain example implementations may further include receiving, via the first channel, and from the first ground station, one or more updated downlink instructions for communicating with a second ground station; selecting a downlink communication channel based on the received one or more updated downlink instructions; and transmitting information to the second ground station via the selected downlink communication channel.

In some implementations, the one or more updated downlink instructions can include one or more of: specific channel instructions for communicating with the second ground station; and/or a listing of candidate frequencies for communicating with the second ground station.

According to an example implementation of the disclosed technology, the selected downlink communication channel may remain available for communication between the target satellite and the first ground station until communication is established with a second ground station.

Certain example implementations of the disclosed technology may further include selecting, for communications with a second ground station, a second channel of the candidate satellite communication channels based, at least in part, on a determined position of the target satellite with respect to the second ground station.

Certain example implementations may include selectively scanning through the plurality of predefined satellite communication channels, and selectively filtering the received spectrum of frequencies to select a second channel of the plurality of predefined satellite communication channels when the first channel is occupied.

In certain example implementations, the selectively filtering is further based on an orbit of the target satellite. In certain example implementations, the selectively filtering is further based on an orientation of the target satellite. In certain example implementations, the selectively filtering is further based on a status of other orbiting satellites. In certain example implementations, the selectively filtering is further based on mission knowledge. In certain example implementations, the selectively filtering is further based on beacon activity.

In accordance with an example implementation of the disclosed technology, selectively filtering the received plurality of frequencies may be utilized to select a second channel of the plurality of predefined satellite communication channels based, at least in part, on a determined position of the target satellite with respect to a second ground station.

IMPLEMENTATION SUMMARY

The system and method disclosed herein may maintain backwards compatibility with existing systems, where possible.

Profiles

In certain example implementations, a UHF radio may be configured based on multiple profiles. A profile may include configuration settings configurable by the operator. Such configuration settings may include a frequency and/or a symbol rate. Some but not all profiles can be deactivated by the operator. When deactivated, the profile may be deleted and all of the configuration settings may be lost.

In an example implementation, a profile may include settings that may be automatically configured or implied, including one or more of: a frequency offset; a deviation (for example, ¼th the symbol rate); an implied direction (uplink/standard XOR downlink); cached configuration data (e.g. calibration results) for performance optimization (which may be automatically generated and stored); and other configuration data (e.g. other radio register configuration values) that may exist independent of the profile, and that may be modified, stored and recalled.

Factory Default Profiles (FDPs) may be compiled-in profiles that are not intended to be modifiable at run time. Such profiles may not be directly executable, but the base profiles may be configured to the FDPs during factory default. In certain example implementations, the FDPs may be configured to correspond to US-based communication frequencies. According to an example implementation of the disclosed technology, the FDPs may include:

a. Factory Default Uplink/Standard Profile (DEFUP)
   b. Factory Default Downlink Profile (DEFDN)
   c. Factory Default Beacon Downlink Profile (DEFBC)

Base Profiles (BPs) may be defined as current profiles stored in memory, and recalled upon bootup. During a factory default, for example, the BPs may be equivalent to the Factory Default Profiles. In certain example implementations, the BPs may be configured (set_frequency, set_baudrate_deviation, etc.) and stored (e.g. flash_store) in memory. In certain example implementations, a user may be able to configure each profile individually. According to an example implementation of the disclosed technology, the BPs may include:

a. Base Uplink/Standard Profile (BASUP)
   b. Base Downlink Profile (BASDN)
   c. Base Beacon Downlink Profile (BASBC).

Optional Alternative Uplink Profiles (OAUPs) may include OPUP01 . . . OPUPxx, and may be defined as additional uplink-only profiles (for example, in addition to the BASUP), through which the radio may periodically rotate. These OAUPs may be stored into memory, and may be wiped out (deactivated) upon factory default:

Hypothetical Profiles (HPs) may exist, but may not be explicitly enumerated in the software, but are used to explain concepts in this IMPLEMENTATION SUMMARY. For example, the HPs may include a Currently Operating Profile (COP), which may represent the profiles currently being operated by the radio, i.e. loaded into the CC1101/CC1125 registers. In certain example implementations, any of the above may be loaded into these profiles, but can also be manually modified. The COP may be represented by one or more of the following, as depicted in FIG. 2:

a. CURUP
   b. CURDN
   c. CURBC

Modified Profile (MP) may include a subset of CURUP/DN when the currently operating profiles are modified by the operator by way of manual commands or contact profiles. For example, the MPs may include one of more of the following, as depicted in FIG. 2:

a. MODUP
   b. MODDN
   c. MODBC

In certain example implementations, and during contact, CURDN/MODDN may be used for beacons, and MODBC may not be used in practice, though it may be stored into other profiles, such as BASBC.

Profile Configurability

In certain example implementations, only Factory Default Profiles (FDPs) DEFUP, DEFDN, and DEFBC are set at compile time. By default, OPUPxx profiles may be cleared out and unused. In certain example implementations, BASUP, BASDN, BASBC, OPUPxx, CURUP and CURDN may be configurable at run time.

Asymmetric Configurations

In accordance with an example implementation of the disclosed technology, the radio may be capable of different uplink and downlink configurations. However, the radio may also be configured to automatically determine when a transition is not necessary, namely, when complementary profiles (e.g. CURUP and CURDN) are equivalent.

Uplink Profile Logic

In certain example implementations, the adaptable space radio's current uplink configuration (CURUP) may be configured to rotate periodically through BASUP and any activated OPUPxx configuration. At factory default, there may be no OPUPxx activated, and CURUP may reload as BASUP and continue to operate with the BASUP. In an example implementation, whenever a message is received in uplink, the CURUP may be held (i.e. rotation prevented) for a preset amount of time. In an example implementation, any additional message received during this time may reset a counter to continue holding the CURUP in its present state. In an example implementation, the CURUP may still be explicitly modified (aka MODUP) by the operator via manual commands such as set_frequency, set_baudrate, etc. In certain example implementations, a contact profile can also be sent (i.e. at a beginning of a contact) to temporarily modify CURUP as well, with a specified hold time amount.

Downlink Profile Logic

According to an example implementation of the disclosed technology, the adaptable space radio's current downlink configuration (CURDN) may be primarily set to BASDN. In an example implementation, when a message is received, regardless of uplink, a response may be made with BASDN. In an example implementation, CURDN may be modified (aka MODDN) by the operator via one or more of: manual commands (such as set_frequency, set_baudrate, etc.) or a contact profile (as will be discussed below).

In an example implementation, a beacon may be characterized by a separate profile. For example, when a beacon is transmitted, BASBC may be loaded onto CURDN, then after transmission, BASDN may be reloaded. During a hold-phase, however, whatever CURDN is being used for CDH may also be used for beacons, rather than BASBC.

Manual Modification of Configuration Settings

In accordance with an example implementation of the disclosed technology, if an operator manually modifies configuration settings (such as baudrate, frequency), the new settings (MODUP, MODDN, MODBC) may be lost after the hold timeout if not otherwise stored. In certain example implementations, certain methods may be used to store such settings. For example, the settings MODUP+MODDN+MODBC may be stored (for example, by flash_store) into BASUP+BASDN+BASBC configurations respectively. In certain example implementations, basic parameters (frequency and baudrate) may be stored into BASUP, BASDN, BASBC individually. Deviation and offset may be determined automatically.

Using Contact Profiles

In an example implementation, an operator may send a contact profile, which specifies the following: a MODUP profile; a combined MODDN/MODBC profile; and a contact hold-phase duration (or a specification to use the default onboard timeout). In an example implementation, when the adaptable space radio receives this packet, it may be configured to switch to listening on the specified uplink, and downlink to all packets (including beacons) for the contact sticky duration of the temporary profile on the specified downlink.

In certain example implementations, the adaptable space radio may contain a separately configurable activity hold-phase duration. The contact hold-phase duration may allow an operator to specify a wider timeout in the case the link is worse than expected, or if for some reason, contact transmission activity is sporadic. In certain example implementations, the larger of the two will always be used for the timeout calculation.

Profile Transition Diagram

FIG. 2 is a diagram of an example profile transition scheme 200, according to an example implementation of the disclosed technology. According to certain example implementations, the profiles may be generally divided into a current uplink profile scheme 201 (CURUP), and a current downlink profile scheme 203 (CURDN), with associated profiles. In an example implementation, certain factory default profiles may be utilized, including but not limited to (a) Factory Default Uplink/Standard Profile (DEFUP), (b) Factory Default Downlink Profile (DEFDN), and (c) Factory Default Beacon Downlink Profile (DEFBC). In certain example implementations, the factory default profiles may be compiled-in profiles and may not be modified at run time. In some implementations, the factory default profiles may not be directly executable, but may be used to configure base profiles (explained below).

In accordance with an example implementation of the disclosed technology, certain base profiles may be utilized, including but not limited to: (i) Base Uplink/Standard Profile (BASUP); (ii) Base Downlink Profile (BASDN); and (iii) Base Beacon Downlink Profile (BASBC). According to an example implementation of the disclosed technology, the current base profiles may be stored in memory, and recalled upon bootup. During a factory default, these may be equivalent to the Factory Default Profiles, as described above. In certain example implementations, the base profiles may be configured (set_frequency, set_baudrate_deviation, etc.) and stored (e.g. flash_store). In certain example implementations, an operator may be able to configure each profile individually.

Certain example implementations may include Optional Alternative Uplink Profiles (OAUPs, for example: OPUP01-OPUPxx). For example, and in addition to BASUP, as discussed above, these OAUPs may be utilized to selectively configure the radio parameters for rotating through the various profile-defined communication frequencies, etc. In certain example implementations, the OAUPs may be stored into memory, but may be deleted upon factory default.

Sequencing

FIG. 4 depicts an example UHF sequencer flowchart 400, according to an example implementation of the disclosed technology.

In accordance with an example implementation of the disclosed technology, the UHF radio "monitor" task on FARCOM (see US2016/0254858, incorporated by reference herein) may take on the additional responsibility of managing the profiles, such as rotation of different active uplink profiles. In an example implementation, a "putstr" (put string) transmit function may manage the configuration of the downlink into the CC1101/CC1125 and restoration of the current standard/uplink profile after transmission. In certain example implementations, the UHF radio "monitor" task may further manage hold-phase modes and timeouts. In certain example implementations, the sequencer does not necessarily control beacon transmission, which may instead be done by the beacon master. In certain example implementations, the two tasks may both be loading different profiles, and may use protected access in order to not conflict with each other.

Sticky (Hold-Phase) Operations

In accordance with an example implementation of the disclosed technology, toggling of profile sets (for example the OPUPxx's, as shown in FIG. 2) may be temporarily delayed when transmitting or receiving data. For example, a configurable "sticky" timeout value may represent the time at which the line must be quiescent in both RX and TX (disregarding beacons) until the sequencer will toggle again. For example, in one implementation, a factory default activity sticky timeout may be configured to 60 seconds, however this timeout value may be set as needed.

Features

In accordance with an example implementation of the disclosed technology, a Special Beacon TX Profile may be utilized. In this implementation, the beacon master may initiate the loading of the BASBC profile (discussed above) prior to transmission. After transmission of the beacon, the previous downlink profile may be restored. In certain embodiments, the BASBC may not be used during a contact (i.e. the sticky duration of activity).

In an example implementation, a Beacon Indefinite Disable feature may be utilized. In this implementation, an additional flag in non-volatile memory can be set to disable the beacon indefinitely, and which can be configured to be persistent over factory default. In certain example implementations, this flag may be settable by an operator. In certain example implementations, the flag may be automatically set to disable if a certain predetermined time has elapsed with no RX activity whatsoever. In certain example implementations, this logic will only occur upon startup of the radio.

In certain example implementations, a persistently stored "quiescence" bootcount will increment upon bootup. If any data is received over the radio, the quiescence bootcount may be reset to 0. Subsequent data received during the same uptime will not incur any additional writes to nonvolatile storage once the quiescence bootcount is already 0. If the quiescent bootcount reaches a predetermined limit <TBD, likely 112*>, it will set the indefinite disable flag to be true. The indefinite disable flag can be set by the operator manually, but as discussed above, will happen automatically if the quiescent bootcount reaches a threshold. Note that any receipt of data, which resets the bootcount, does NOT reset the indefinite disable flag. In certain example implementations, the indefinite disable flag can be reset by the operator manually enabling beacons as before.

* In certain example implementations, the nominal toggle period may be 90 minutes, which is 16 times a day, meaning that the radio will nominally be booted 8 times a day, or 112 times in 2 weeks. In certain example implementations, the toggle may be set to trigger after 2 weeks of quiescence with nominal settings.

Beacon Chillout

The beacon chillout may operate with the additional logic such that when downlink transmissions are initiated by the satellite (e.g. one-way STP blast transmission), the chillout timer will also be reset. The beacon transmission itself may not count towards chillout.

Beacon Changes

As explained in the Conops section below, beacons from the radio may include some additional information to allow ground stations to appropriately readjust its uplink profile. Such information can include a frequency of the currently active uplink profile (CURUP), which may be provided in the header on every beacon. Since baudrate is typically limited to very few settings, it may be left out of the beacon. In an example implementation, the baudrate may be included in the beacon.

Commands

In an example implementation, the commands may operationally remain the same, but may change the characteristic of all current uplink and downlink profiles (CURUP, CURDN,CURBC). For example, if the flash_store commands are used, then BASUP, BASDN and BASBC may be modified, and will persist across reboots (unless factory default threshold is met). According to an example implementation of the disclosed technology, parameters that are not managed in profiles (e.g. preamble size) will be stored in the same way, and will be utilized for all profiles.

In accordance with an example implementation of the disclosed technology, the flash_reset commands will, by default, restore factory defaults, such that: all OPUPxx are wiped out; CURUP=BASUP=DEFUP; CURDN= BASDN=DEFDN; and CURBC=BASBC=DEFBC. In certain example implementations, new commands may be implemented with augmented data or functionality, and may be updated in GOSH and SPOC.

According to an example implementation of the disclosed technology, the frequency, baudrate, and/or offset commands (Set_frequency, set_baudrate_deviation, and set_offset, respectively) may be an asymmetric configuration. As a result, a link_dir argument allows for the setting of one or more profiles:

all—CURUP, CURDN, CURBC
down_only—CURDN
up_only—CURUP
beac_only—CURBC
downbeac—CURDN+CURBC
updown—CURUP+CURDN Setting and Resetting Profiles In accordance with an example implementation of the disclosed technology, certain profile parameters may be set (e.g., frequency and baudrate) with one command. In certain example implementations, a specific profile may be required for BASUP, BASDN, BASBC, OPUPxx. In an example implementation, profiles may be configurable regardless of whether the sequencer has currently loaded the profile. In an example implementation, such setting or resetting may not affect CURDN/CURUP, even if the profile being modified is the last loaded. In certain example implementations, profiles may be stored immediately into nonvolatile memory. In an example implementation, a clear command may be used to deactivate one or more OPUPxx profiles. In an example implementation, a set command may be used to setup a contact profile: as discussed above, at the beginning of a contact, a preferred CURDN, CURUP, and temporary sticky time can be transmitted in one command. In an example implementation, a set symmetric command may require an argument that specifies whether to set BASDN and/or BASBC.

Beacon Commands

In an example implementation, a beacon disable command may have the option to deactivate beacons indefinitely (i.e. over factory defaults). SEQUENCER CONFIGURATION COMMANDS In certain example implementations, the sequencer configuration commands may be utilized to set the following sequencer configuration parameters: rotating uplink period, sticky timeout period. In certain example implementations, such commands may utilize an invocation of the current flash_store method.

Configuration Get Commands

In accordance with an example implementation of the disclosed technology, a command may be utilized to get and display any and all profiles. For example, such commands may be utilized to show indefinite disable state associated with a beacon, add sequencer configuration parameters into existing get configuration command; and/or add current (last loaded) profile into existing get housekeeping/stats command.

Conops Approach

According to certain example implementations of the disclosed technology, when a satellite comes into contact view with a ground station, it may be listening on either its default frequency, or on one of the alternative uplink frequencies. In an example implementation, the ground station may decide, based on the licensed frequencies available to it, what frequency for which to uplink to the satellite, and in certain implementations, the ground station may make the assumption that it will have been configured with all potential uplink frequencies. On that uplink frequency, the ground station may send a temporary profile configuration packet which configures the uplink frequency and downlink frequency to a desired set, with a timeout equal to the remaining length of the contact. In certain example implementations, the ground station may retry until it gets a response. Once there is a response, the contact may proceed as usual. If the satellite is either (a) not configured to listen on the right uplink frequencies, due to lack of existing available resources or excessive radio resets, or (b) if the response to the temporary profile packet sent above is lost, the ground station may additionally be listening for beacons on: the satellite's base beacon frequency (BASBC); the satellite's factory default beacon frequency (DEFBC); and/or the configured downlink frequency being sent in the temporary profile packet.

In certain example implementations, beacons from the radio can include information on the currently active uplink frequency and list of alternative frequencies. In an example implementation, the ground station may then readjust the configuration by sending a temporary profile configuration packet on a frequency that the beacon indicates the radio will listen on (assuming the ground station is allowed to do so). If the ground station does not have a license to transmit on any of those frequencies, it can at least trigger an alert to SatOps and the schedule can be readjusted to get the satellite a contact where it can be reconfigured.

In certain example implementations, ground stations and ground control software may contain the capabilities of: knowledge and coordination of the desired contact frequencies employed by other ground stations in the vicinity (to avoid crosstalk); knowledge of last configured set of uplink profiles for any given satellite; and/or an ability to use beacon information, namely satellite ID and uplink frequency, to determine how to make initial contact with a satellite during the pass.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for adjusting satellite radio frequencies, the method comprising:
    scanning, by a radio on a satellite, over a range of radio frequencies until detecting a predefined synch word;
    receiving, from a first ground station, at an uplink radio frequency, an incoming transmission directed to the satellite to initiate communication between the satellite and the first ground station, the incoming transmission including a first synch word that identifies the satellite that the incoming transmission is directed to, and the incoming transmission including a command specifying a download radio frequency to be used by the satellite for downlink communication with the first ground station;
    comparing the first synch word with the predefined synch word;
    determining that the first synch word is proper based on the comparison;
    stop scanning the range of radio frequencies after determining that the first synch word is proper;
    determining, by the satellite, the downlink radio frequency specified in the command of the incoming transmission for downlink communication with the first ground station, wherein the uplink radio frequency is different from the downlink radio frequency;
    changing a downlink configuration of the radio from an existing downlink radio frequency to the determined downlink radio frequency specified in the incoming transmission; and transmitting downlink communication to the first ground station at the determined downlink radio frequency.

2. The method of claim 1, further comprising:
    receiving, by the satellite, from the first ground station, a plurality of signals associated with a plurality of candidate satellite communication channels; and
    selectively filtering the received plurality of signals to define a reduced subset of candidate channels from the plurality of candidate satellite communication channels.

3. The method of claim 2, wherein the satellite selects, for communications with the first ground station, a first channel of the candidate satellite communication channels by cycling through the reduced subset of candidate channels.

4. The method of claim 3, wherein selecting the first channel is further based on one or more of: header information, a sync word, forward error correction scheme, and an encryption key.

5. The method of claim 3, wherein selecting the first channel is further based on a status of the satellite.

6. The method of claim 5, wherein a status of the satellite comprises one or more of:
an orbit of the satellite;
an orientation of the satellite;
a geolocation of the satellite;
beacon activity of the satellite; and
a determined position of the satellite with respect to the first ground station.

7. The method of claim 3, wherein selecting the first channel is further based on one or more of:
a status of another orbiting satellite;
beacon activity of another orbiting satellite;
time of day; and
a likelihood of communication interference.

8. The method of claim 3, further comprising:
receiving, via the first channel, and from the first ground station, one or more updated downlink instructions for communicating with a second ground station;
selecting a downlink communication channel based on the received one or more updated downlink instructions; and
transmitting information to the second ground station via the selected downlink communication channel.

9. The method of claim 8, wherein the one or more updated downlink instructions comprise one or more of:
specific channel instructions for communicating with the second ground station; and
a listing of candidate frequencies for communicating with the second ground station.

10. The method of claim 8, wherein the first channel remains available for communication between the satellite and the first ground station until communication is established with the second ground station.

11. The method of claim 3, further comprising selecting, for communications with a second ground station, a second channel of the candidate satellite communication channels based, at least in part, on a determined position of the satellite with respect to the second ground station.

12. A satellite communications system comprising:
a plurality of satellites including a target satellite;
a plurality of ground stations including a first ground station;
at least one memory for storing data and computer-executable instructions;
at least one processor in communication with the at least one memory, wherein the at least one processor is further configured to execute the computer-executable instructions to cause the system to:
scan, by a radio on the target satellite, over a range of radio frequencies until detecting a predefined synch word;
receive, from the first ground station, at an uplink radio frequency, an incoming transmission directed to the target satellite to initiate communication between the target satellite and the first ground station, the incoming transmission including a first synch word that identifies the satellite that the incoming transmission is directed to, and the incoming transmission including a command specifying a downlink radio frequency to be used by the target satellite for downlink communication with the first ground station;
compare the first synch word with the predefined synch word;
determine that the first synch word is proper based on the comparison;
stop scanning the range of radio frequencies after determining that the first synch word is proper;
determine, by the target satellite, the downlink radio frequency specified in the command of the incoming transmission for downlink communication with the first ground station, wherein the uplink radio frequency is different from the downlink radio frequency;
dynamically change a downlink configuration of the radio from an existing downlink radio frequency to the downlink radio frequency specified in the first incoming transmission;
transmit downlink communication to the first ground station at the downlink radio frequency.

13. The system of claim 12, wherein
at least the target satellite is configured to:
receive, from the first ground station, a plurality of frequencies associated with a plurality of candidate satellite communication channels; and
filter the received plurality of frequencies selectively to define a reduced subset of candidate channels from the plurality of candidate satellite communication channels.

14. The system of claim 13, wherein at least the target satellite is configured to cycle through the reduced subset of candidate channels to select, for communications with the first ground station, a first channel of the candidate satellite communication channels.

15. The system of claim 14, wherein the first channel is further selected based on one or more of: header information, a sync word, forward error correction scheme, and an encryption key.

16. The system of claim 14, wherein the first channel is further selected based on a status of the target satellite.

17. The system of claim 16, wherein a status of the target satellite comprises one of more of:
an orbit of the target satellite;
an orientation of the target satellite;
a geolocation of the target satellite;
beacon activity of the target satellite; and
a determined position of the target satellite with respect to the ground station.

18. The system of claim 14, wherein the first channel is further selected based on one or more of:
a status of another orbiting satellite;
beacon activity of another orbiting satellite;
time of day; and
a likelihood of communication interference.

19. The system of claim 14, wherein the target satellite is further configured to:
receive, via the first channel, and from the first ground station, one or more updated downlink instructions for communicating with a second ground station of the plurality ground stations;
select a downlink communication channel based on the received one or more updated downlink instructions; and
transmit information to the second ground station via the selected downlink communication channel.

20. The system of claim 19, wherein the one or more updated downlink instructions comprise one or more of:
   specific channel instructions for communicating with the second ground station of the plurality ground stations; and
   a listing of candidate frequencies for communicating with the second ground station.

* * * * *